(12) United States Patent
Lee et al.

(10) Patent No.: US 8,719,141 B1
(45) Date of Patent: May 6, 2014

(54) APPARATUS AND METHOD FOR CONDUCTING A RECURRING AUCTION USING A PARTICIPANT RETENTION MECHANISM

(75) Inventors: Juong-Sik Lee, Troy, NY (US); Boleslaw Karol Szymanski, Newtonville, NY (US)

(73) Assignee: Optimaret, Inc., Newtonville, NY (US)

( * ) Notice: Subject to any disclaimer, the term of this patent is extended or adjusted under 35 U.S.C. 154(b) by 966 days.

(21) Appl. No.: 11/258,476

(22) Filed: Oct. 25, 2005

Related U.S. Application Data

(60) Provisional application No. 60/622,028, filed on Oct. 26, 2004.

(51) Int. Cl.
*G06Q 40/00* (2012.01)

(52) U.S. Cl.
USPC ............ 705/37; 705/14.71; 705/26.3; 705/35

(58) Field of Classification Search
USPC .......................................................... 705/37
See application file for complete search history.

(56) References Cited

U.S. PATENT DOCUMENTS

| | | | | |
|---|---|---|---|---|
| 6,078,906 | A * | 6/2000 | Huberman | 705/37 |
| 7,225,152 | B2 * | 5/2007 | Atkinson et al. | 705/37 |
| 2001/0021923 | A1 * | 9/2001 | Atkinson et al. | 705/37 |
| 2001/0039528 | A1 * | 11/2001 | Atkinson et al. | 705/37 |
| 2003/0041010 | A1 * | 2/2003 | Yonao-Cowan | 705/37 |
| 2004/0024682 | A1 * | 2/2004 | Popovitch | 705/37 |
| 2004/0039677 | A1 * | 2/2004 | Mura et al. | 705/37 |
| 2004/0133503 | A1 * | 7/2004 | Podsiadlo | 705/37 |
| 2005/0289043 | A1 * | 12/2005 | Maudlin | 705/37 |
| 2006/0136324 | A1 * | 6/2006 | Barry et al. | 705/37 |
| 2006/0212585 | A1 * | 9/2006 | Eaton et al. | 709/227 |
| 2007/0156575 | A1 * | 7/2007 | Sandholm et al. | 705/37 |
| 2008/0015973 | A1 * | 1/2008 | Erisman | 705/37 |
| 2008/0162330 | A1 * | 7/2008 | Atkinson et al. | 705/37 |

* cited by examiner

*Primary Examiner* — Bruce I Ebersman
*Assistant Examiner* — Kevin Poe
(74) *Attorney, Agent, or Firm* — Jay R. Yablon

(57) ABSTRACT

The present invention includes a method and system for trading goods and services through recurring auctions. Recurring auctions are increasingly popular form of markets for perishable and time-sensitive resources. Traditional auctions strive to motivate bidders to bid their true valuation of the resources traded. Yet, when successful, they also quickly divide the recurring auction bidders into permanent winners and permanent losers. The latter have no incentive to stay in the market, so they leave, decreasing the competitive pressure and depressing pricing. The present invention introduces a novel winner selection method to maintain customers' interest in auction participation that employs participant retention mechanism in assigning traded resources to bidders. The winners are selected from a wider range of bidder ranks than in traditional auction mechanisms. For a group of bidders, winner selection takes into account bid values, allocation of resources and participation of each bidder in the previous auction rounds.

4 Claims, 3 Drawing Sheets

The dark bidders are losers, the white bidders are winners. The upper part shows winners in the traditional auction and lower part show winners in the auction round executed according to the present invention's auction.

APPARATUS AND METHOD FOR CONDUCTING A RECURRING AUCTION USING A PARTICIPANT RETENTION MECHANISM

CROSS REFERENCE TO RELATED APPLICATION

The present application claims priority to U.S. Provisional Patent Application No. 60/622,028, filed Oct. 26, 2004, the entire disclosure of which is incorporated herein by reference.

BACKGROUND OF THE INVENTION

1. Field of the Invention

The present invention relates to an apparatus and method for conducting an electronic recurring auction in which time limitations for auction execution and the number of bids and resources necessitate use of a computer to perform each auction round and the entire auction consists of auction rounds sharing one or more of the following factors: common seller, common bidders, and similar resources being traded, however each auction round trades new resources. In particular, the present invention uses a computer storage with a computer-readable medium having computer code thereon for performing various computer-implemented operations necessary for timely execution of each auction in which the winners are selected not only on the basis of the bids but also on the basis of their participation in and results of previous auction rounds.

2. Description of the Related Art

An auction is a market institution with an explicit set of rules matching supplies with demands for traded resources and determining sell prices on the basis of bids from the market participants [1]. In relation to the present invention, resources include goods, services, leases, licenses, contracts, orders, or anything else which auction participants are willing to trade. In many cases, auctions will repeat frequently, either to trade a new supply of consumable resources, or to trade a new period of time for reusable resources or for other relevant reasons.

For direct auctions, purchasers are termed bidders, and the seller or sellers are termed the auctioneer. For reverse auctions, the purchasers are termed the auctioneer and sellers are termed bidders. The present invention applies irrespective of whether the participants (bidders and auctioneers) carry out their roles directly, through an agent, or using an automated program, and also irrespective of whether the participants (bidders and auctioneers) are individuals, legal entities, or syndicates of individuals or legal entities. Also, for the purposes of this document a "higher" bid is defined as one more advantageous to the auctioneer, i.e., a higher bid for purchasing a resource in direct auctions and a lower bid for selling a resource in reverse auctions.

Participants' bids are dependent on their respective resource valuation that may vary widely across participants. When offered the resource at the price equal to his valuation, the bidder is indifferent between trading and not trading the resource. For each bidder, such valuation is called the true valuation of that bidder for the traded resource. The difference between the true valuation and the price paid for the resource defines the bidder's utility from a transaction [2]. On the other hand, the price paid by each bidder who received resources defines the revenue of the auctioneer. As a result, the total utility of an auction, that is the sum of the utilities of all bidders and the revenue of the auctioneer, is equal to the sum of the true valuations of the auction-winning bidders.

Hence, one desirable property of an auction is allocating each resource to the bidder who values it the most (i.e., has the highest true valuation for this resource). This property ensures the highest possible total utility of an auction resulting in the so-called efficient auction [2]. Another important property, often related to the previous one, is to provide the incentive for the bidders to bid their true valuation, because if they do, making auction efficient is easy since the auctioneer knows the bidders true valuations from their bids.

By definition [2], the dominant strategy of each bidder is the strategy of selecting the bid that maximizes the bidder's utility from the auction. An auction mechanism that makes bidding true valuation the dominant strategy of each bidder is called incentive compatible. This is a desirable property for the auction mechanism as it enables an efficient auction and aims at maximizing the seller's revenue.

The bids entered in an auction could be either sealed (in which case, each bid is known only to the bidder issuing it and the auctioneer) or open, (in which case all bids are known to all bidders and the auctioneer). Common forms of sealed bid auctions include the First Price Sealed Bid (FPSB) auction and Second Price Sealed Bid (SPSB) auction.

In a First Price Sealed Bid (FPSB) auction, each bidder submits one sealed bid (in ignorance of all other bids) to the auctioneer. The latter determines the highest bid; the bidder with this bid receives the resource at the price equal to his bid (so in a basic FPSB auction the bid value is equal to the bid).

In a Second Price Scaled Bid (SPSB) auction, each bidder also submits one sealed bid and the bidder with the highest bid is the winner. However, the selected winner pays the price that is equal to the second-highest bid. This auction mechanism is also called the Vickrey Auction [3]. Vickery proved theoretically that the dominant strategy for each bidder is to bid his true valuation [3].

The basic auction mechanisms described above have been generalized in many directions. In a Multi-attribute Auction (MA), the auctioneer selects winners based on a bid as well as on various other attributes, some of which may be a component of the bid (such as a proposed settlement time), while others may be properties of the bidder. A generic procedure for selecting winners in a multi-attribute auction in electronic procurement environments is presented in [4, 5]. The utility function of a Multi-attribute Auction is based on Multi-Attribute Utility Theory (MAUT) [6, 7].

Combinatorial Auctions allow each bidder to offer a bid for a collection of goods (of the bidder's choosing) rather than placing a bid on each resource separately. This enables the bidder to express dependencies and complementarities between goods. The auctioneer selects such set of these combinatorial bids that results in the largest revenue without assigning any object to more than one bidder. However, determining the set of winners of the auction that maximizes the revenue for large numbers of bids is computationally very intensive (more precisely, it is an NP-complete problem [8, 9]). Under certain restrictions, such as a limited number of bids, an efficient solution is possible [8]. An auction house with a generalized combinatorial auction is described in [10].

The Vickrey Auction has also been generalized to the case in which there are multiple units of a resource [11]. The so-called Generalized Vickrey Auction (GVA) mechanism determines the allocation of multiple units of a resource to the bidders in a way that makes the auction incentive compatible but finding such allocation is computationally intense (NP-complete [11]).

In the current state of the art, all auction systems can be generalized into the six-step process as described below and depicted in FIG. 1.

The bid collection and validation procedure collects the bids from the users participating in the market. This component can be represented by a human agent or can be embedded in a computer system. Bids may be firm (not revisable or cancelable) or changeable under predefined rules. In the case of combinatorial auctions, bids will also contain additional contingent characteristics. Furthermore, bids may or may not roll over into the next auction round under pre-specified rules or may be conditional upon specific conditions being met. Such factors can be defined in arbitrary ways by the auctioneer based upon what is deemed suitable for the specific application. Any set of predefined rules can be used for eligibility of the bid and bidder to participate in the relevant auction round, including, but not limited to, legal restrictions, credit limits on particular bidders, minimum/maximum bid amounts and sizes, etc. Cancellation of bids that do not meet such requirements comprises the validation stage of the process.

An auction round close occurs once a specific set of circumstances are met, as defined by the auctioneer. These could include the availability of the resource, time elapsed since the preceding auction round close, receipt of sufficient number of bids, or any other conditions relevant to the specific application. Once an auction round closes, further computation occurs and bids would not be changeable or revocable. The time between when one auction round closes and the next one opens for bids can also be defined arbitrarily or by specific relevant conditions.

The valuation and bid ranking procedure operates after the auction round closes. The bid ranking procedure computes the bid value for each bid collected and eligible for participation according to any specific rules set. The most basic auction mechanisms equate the bid value with the bid itself. A lot of innovation went into providing more subtle bid valuation methods, reflecting additional features. In multi-attribute auctions, multiple attributes of the bid are combined into a single bid value [4]. One example of assigning bid value on a basis other than just a bid arises in Internet search pay-per-click advertising auctions in which a bid value is the product of the bid and click-through rate [12]. Other potential methods for assigning a value to a bid by the given bidder include additional information about the bid and the bidders, such as the time of the bid, geographical location of the bidders, etc. The final result of this procedure is the list of bidders ranked according to the values assigned to their bids. The present invention is applicable to any specific valuation and bid ranking procedure.

In the resource collection and ranking procedure, all resources available for allocation in the given round are ranked according to their intrinsic values, usually established by the auctioneer. A resource can be placed in an arbitrary order with respect to resources from which its intrinsic value cannot be differentiated. The resulting rankings may be collected in human accessible media (e.g., a printed list, list displayed on a screen etc.) or created in computer-assisted media to ensure timely and efficient processing of the information. Any relevant factors can be used to assign intrinsic value rank to the resources, as deemed appropriate to the specific application. Generally, the ranking reflects differences in intrinsic values of each individual unit of the resource. For example, value and therefore ranking of seats at the theater could be differentiated based on the distance from and the visibility of the stage. Likewise, the value and therefore ranking in Internet search pay-per-click advertisements is differentiated based on the position of the advertisement link on an Internet search query page [12].

The winner selection step takes each winner and establishes the mapping of bidders to resources. Traditional auction mechanisms map the bidder ranked k=1, 2, . . . up to the number of resources available, to the resource of the same rank.

The final step, pricing method computes the price to be paid by each bidder that receives a resource. The two main variants of pricing method step in the current state of the art are to pay the price equal to either own bid (FPSB) or the bid of the next highest bidder (SPSB). In the case where the bidders are ranked using other features in addition to the bid, the SPSB guarantees that the price paid by the bidder does not exceed the own bid of such bidder.

There may be additional contingencies which govern the exact amount of the final payment or whether there is to be any payment, such as whether the resource is fully utilized, delivered in accordance to preset terms, or other predefined rules. For instance, in commodities futures markets, different quality grades of the same resource have a fixed discount or premium to the basic price when they are delivered at expiry. Another example is Internet search pay-per-click advertisements, in which the final payment to the auctioneer is only triggered if a third party clicks on such advertisement.

Recurring auctions are increasingly popular form of markets for resources including but not limited to perishable goods (fresh flowers that wilt, fresh food that spoils and Internet search pay-per-click advertisements that appear only once immediately after a search query, etc,) and services for a specific time period (e.g., ticket for a designated flight, a specific concert, computer network bandwidth allocation for predefined period of time or parking spot reservation for the specific time, as well as leases). Traditional auctions strive to motivate bidders to bid their true valuation of the resources traded. Yet, when successful in that respect, they also quickly divide the bidders into permanent winners (those with high true valuation of the traded resources) and permanent losers (those with low true valuation for the traded resources). In a recurring auction, the latter have no incentive to stay in future auction rounds, as they repeatedly lose the desired resource for which they are bidding. As a result, sooner or later, permanent losers of previous auction rounds drop out of the future rounds of a recurring auction. For purposes of the present invention, this phenomenon is referred to as a bidder drop. The bidder drop decreases the competitive pressure and therefore depresses the bids entered in future auction rounds [13].

BRIEF SUMMARY OF THE INVENTION

The present invention relates to recurring auctions. It includes the system and method for conducting an auction repeatedly over time for a plurality of resources. The invention also includes a method for allocating traded resources to bidders in each auction round of a recurring auction in which the said allocation is based not only on the bid prices but also on bidder participation record in previous auction rounds. Any such method is referred to as a participant retention method.

The participant retention method preferably operates by selecting a certain number of bidders as belonging to Definite Winner class in the current auction round, based strictly on their bid values. At the same time, the remaining winners are selected from the remaining bidders taking into account a number of factors, including bidders' participation in the previous auction round or number of rounds, bids that they entered and the number and timings of resource allocations that they received in the previous auction round or a number of rounds. In one embodiment of the invention, this is accomplished by retaining some resources available in an auction round for the allocation to a set or subset of bidders from previous auction rounds. The specifics of methods for defining such resources and subsets of bidders are described below.

The selection of the winners enhancing participant retention can be accomplished using one of many possible participant retention methods. The winner selection method explicitly or implicitly classifies bidders into three classes, Definite Winner class (DW), Definite Loser class (DL) (both also present in traditional auction mechanism) and a new one called Possible Winner class (PW). There may be fewer resources assigned to the Possible Winner class than there are bidders in this class. In one embodiment of the invention, the participant retention method uses the number of consecutive losses together with the bid value as the criterion for selection of winners in Possible Winner class. In another embodiment, the bidders in Possible Winner class who lost the last round and did not decrease their bids are selected before the others to enhance participant retention. Yet another embodiment computes the difference between the already achieved and expected numbers of wins as a criterion for winner selection in Possible Winner class. When applied to the recurring auction, the invention results in higher and stable revenue of the auctioneer compared to the traditional auction mechanisms.

BRIEF DESCRIPTION OF THE FIGURES

The invention is more fully appreciated in connection with the following detailed description taken in conjunction with the accompanying drawings, in which.

DETAILED DESCRIPTION OF THE INVENTION

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; flash memory; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or any other programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

Figure 1:
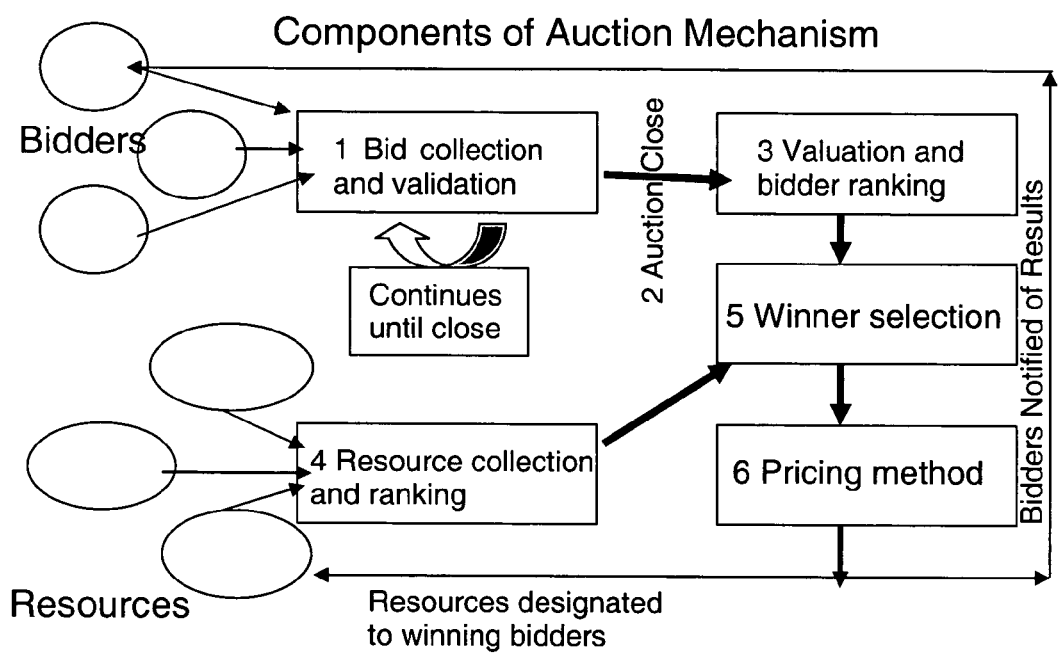
FIG. 1 illustrates the basic components and flow of information in auction.
Figure 2:
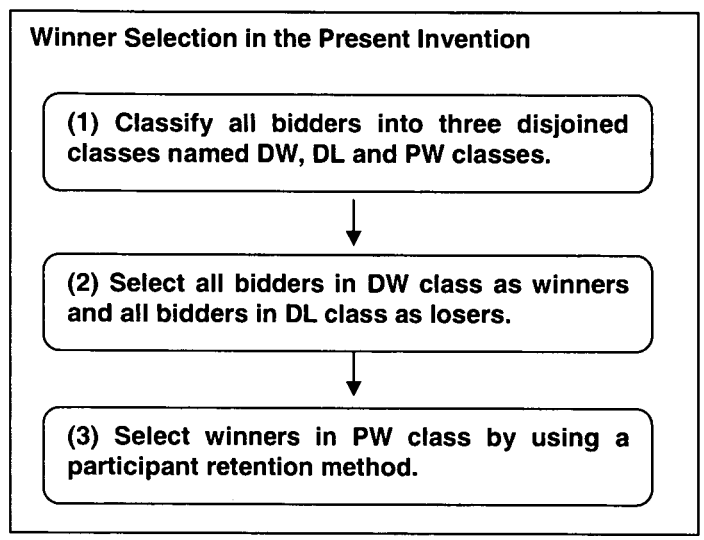
FIG. 2 illustrates the novel winner selection method that is applied after the bids from the bidders are collected and the auction round is closed.

The present invention provides a novel winner selection method in a recurring auction. As such, the invention fits seamlessly into the framework of an auction shown in FIG. 1. As described, the winner selection method is used when the collection of bids closes and after the bidders and resources are ranked. The box labeled winner selection in FIG. 1 is represented in the form of flowchart in FIG. 2 that illustrates the steps of winner selection in the present invention. These steps are further described below.

Step 1: Classification of Bidders

The first step of winner selection method is to perform classification of bidders into three classes: Definite Winner (DW), Definite Loser (DL) and Possible Winner (PW) class. Each bidder is classified into exactly one of the three classes. We will denote the number of bidders in each of those classes as $N_{DW}$, $N_{DL}$, $N_{PW}$, respectively. Inside each class, bidders are ordered according to their ranks established in Step 3. Definite Winner class contains bidders with $N_{DW}$ highest ranked bid values, while Definite Loser class contains bidders with $N_{DL}$ lowest ranked bid values. In general, the present invention does not limit the sizes of the classes, except that the Possible Winner class is nonempty, so it could be that all bidders are in the Possible Winner class (so, $N_{PW}=N$, $N_{DW}=N_{DL}=0$), or that no bidders are in Definite Loser class (so, only $N_{DL}=0$), or that no bidder is assured of win (so only $N_{DW}=0$), and many other combinations.

The described step happens after all bids for the current auction round have been collected and all bidders have been ranked in descending order of their bid values. Denoting the number of resources traded in this auction round by R, it should be noted that a traditional auction mechanism would award those resource to R highest ranked bidders. Denoting the number of bidders in the current auction round by N, it should be observed that in the traditional auction mechanism the remaining N−R bidders will be losers in this auction round. Hence, a traditional auction mechanism has a Definite Loser class of size $N_{DL}=N-R$, and no Possible Winner class ($N_{PW}=0$). In contrast, in the present invention, the Possible Winner class can include any number of bidders, from none to all. Typically, Possible Winner class contains some bidders ($N_{PW}>0$) but an empty Possible Winner class can occur at certain settings of the auction system parameters.

The Definite Winner class can be defined in one of two ways. Either (i) a fixed proportion of the highest ranking resources, $r_{DW}$ is defined, so the top $N_{DW}=r_{DW}*R$ (in other words, the size of Definite Winner class is determined by multiplying a fixed proportion of resources times the number of resources) ranking bidders comprise the DW class, or (ii)

the Definite Winner reservation price, $P_{DW}$, is defined and Definite Winner class consists of those bidders whose bid values are higher than $P_{DW}$.

If a definite winner reservation price, denoted as $P_{DW}$, is set, it should be selected at or above auctioneer's total expected revenue divided by the number of resources traded, so if all sales are made at $P_{DW}$, auctioneer's revenue will meets his expectations.

Selecting the proper proportion of the resources designated for the Definite Winner class by choosing the fixed proportion of the resources factor $r_{DW}$, requires careful analysis of bidding patterns, the desired number of bidders in each auction round, and willingness of bidders to continue participating in the future auction rounds despite of not being allocated the desired resources. In the recurring auction, each bidder may have a drop point, denoted as L, that is defined as the number of times that a bidder has not been allocated desired resources in consecutive auction rounds that will motivate the bidder to leave the recurring auction altogether. The maximum number of bidders in Possible Winner class is $N*(1-r_{DW})*(L-1)$ (which is equal to the number of resources not assigned to Definite Winner class, and therefore assigned to Possible Winner class, multiplied by one less than the bidder's drop point), and it is possible to achieve only under the most efficient participant retention method, as in that case each bidder in Possible Winner class incurs exactly L−1 losses before a win. Hence, selection of factor $r_{DW}$ not only impacts the size of the Definite Winner class but also limits the size of Possible Winner class. The inventors' experiments indicate that for many bidder true valuation distributions, the optimal value of the fixed proportion of the resources factor $r_{DW}$ is around ⅔ [13].

Figure 3:
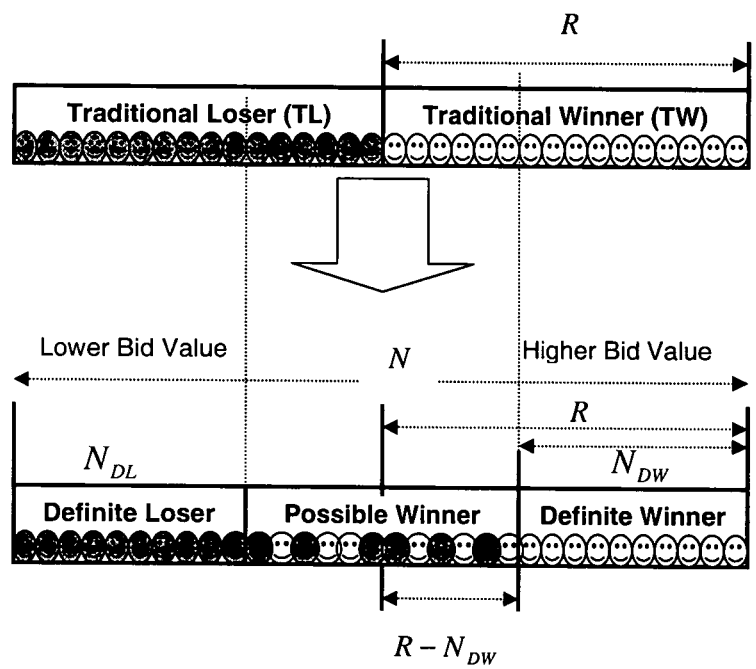
FIG. 3 illustrates the novel method of classifying bidders in the present invention and compares it with the classification of bidders in the traditional auction mechanisms.

The Possible Winner class is defined either by (i) the reservation price $P_{PW}$, so a bidder whose bid value is below this price belongs to Definite Loser class, or (ii) the maximum number of bidders in Possible Winner class is set, so the bidders whose rank is higher than $N_{DW}+N_{PW}$ or whose bid value is 0 are in the Definite Loser class. In both cases Possible Winner class consist of the bidders allocated neither to Definite Winner nor Definite Loser class. With this notation, the number of resources assigned to the Possible Winner class is $R-N_{DW}$ (which is the difference between the total number of resources and the number of resources allocated to Definite Winner class) and the effective participant retention requires that most of the time $N_{PW}>R-N_{DW}$ (so the number of bidders in Possible Winner class is larger than the number of resources allocated to this class). Similarly, if both $P_{DW}$ and $P_{PW}$ are set, then the effective participant retention requires that $P_{DW}>P_{PW}$ (so the Definite Winner reservation price is higher than the Possible Winner reservation price). The FIG. 3 shows the classification of bidders in the present invention.

The reservation price for Possible Winner class, $P_{PW}$, if set, should be selected at or above the cost of each traded resource and the unit cost of conducting an auction round, so the auctioneer revenue from sales at this price will cover his costs.

By introducing two different reservation prices, the present invention addresses the problem of wasted resources that arises in auctions in which perishable goods or time-specific services are traded. Those are resources that lose value extremely rapidly even when unused. These goods cannot be effectively stored for future use without losing the majority of their value. Examples include fresh flowers, pay-per-click search advertisements that expire at the end of each search query, or fresh food, but also time-specific services such as ticket for a designated flight, or for a specific concert, or computer network bandwidth allocation for predefined period of time. In traditional auction methods, one reservation price is used. If fewer bidders exceed this price than there are resources available, then there would be unsold resources that would be wasted in case of perishable goods. The present invention introduces two reservation prices, and if fewer bidders exceed the reservation price for Definite Winner class, the resources will be offered to the bidders in Possible Winner class, avoiding the resource waste.

Selecting the proper size of Possible Winner class requires careful analysis of bidding patterns, willingness of bidders to stay in the auction despite the losses, desired number of bidders in the auction and the quality of the participant retention method. As discussed above the number of bidders in Possible Winner class cannot exceed $(R-N_{DW})*(L-1)$ (which is equal to the number of resources allocated to Possible Winner class times one less than the bidder's drop point), where L is the bidder drop point. Thus, the total number of bidders that participate in the recurring auction permanently cannot exceed $n=(R-N_{DW})*(L-1)+N_{DW}$ (which is just the sum of the size of Definite Winner class and the upper limit of the size of Possible Winner class). As discussed in [1], the optimal bid in a First Price Sealed Bid (FPSB) auction is the following fraction of the bidder's true valuation: $(n-R)/(n-R+1)$ (which is the ratio of number of bidders who were not allocated a resource in an auction round to this number less one). Consequently, larger n makes this fraction larger but requires smaller Definite Winner class ($N_{DW}$), so results in more frequent allocation of resources to the lower bidding bidders. For many bidder true valuation distributions, the inventors observed that the optimal size of the Possible Winner class is around $L*R/3$, but the exact setting of this value should be found experimentally depending on the bidder true valuation distribution, bidder drop point, the number of resources traded and other factors.

Step 2: Winner Selection in Possible Winner Class

After the bidder's classification is done according to step 1, the winner selection process is as follows.

The bidders in Definite Winner class are allocated the top $\min(R, N_{DW})$ (the number of resources in Definite Winner class, or all resources if this number is larger than the total number of resources) resources in the order of their ranking. Of course, all resources R are allocated to Possible Winner class if Definite Winner class is empty ($N_{DW}=0$).

The bidders in Definite Loser class are denied any resources in the current auction round with no further considerations.

The winner selection in Possible Winner class is determined by the participant retention methodology that takes into account such factors as bidder's participation in the current and previous auction rounds, bids that he entered, his number of wins, his number of consecutive losses, etc. All of these factors are used to compute the retention score that combined with the bidder's bid value is used to re-rank the bidders in Possible Winner class. After the re-ranking, the $R-N_{DW}$ highest ranking bidders in Possible Winner class are assigned the remaining ranked resources in the order of their final rank.

Two distinct methods were developed in the present invention to enhance participant retention in recurring auctions. The first approach is to select bidders in a way aiming at decreasing their probability of dropping out of the next auction round. The second approach is to encourage bidders to participate in future auction rounds by providing appropriate reward for their participation. The U.S. Provisional Patent Application No. 60/622,028, filed Oct. 26, 2004 whose entire disclosure is incorporated herein by reference contains on pages 5-21 detailed description of the preferred embodiment of the invention. The following methods were specifically developed as the preferred embodiment of the participant retention methodology.

2.1 Valuable Last Loser First (VLLF): The main idea behind this method is to allocate the resources to a bidder before her dropping out of an auction. In one embodiment, if B denotes the highest bid value received in the current auction round, then every bidder who lost in the last auction round but entered a higher bid in the current round than in the previous one has its bid value increased by B. All bidders in Possible Winner class are re-ranked according to the modified bid values and, in the order of their new rank, are assigned the remaining ranked resources. Many other bidder retention methods being a part of the present invention can be applied to accommodate specific goals of the auctioneer while relying on re-ranking of bidders in Possible Winner class to increase bidder participation in future auction rounds. Some of them, but not all, are described below.

The winners with the modified final bid values gain their ranking based on their bids and losing records in the previous auction round, so there are some bidders in Possible Winner class who retained their bid value and may have lost as the result, despite having the original bid value higher than the winners that increased their bid value. This means that the total auctioneer revenue may be lower compared to the revenue from this auction round without VLLF resource allocation method. To compensate for that effect, bidders with unmodified bid values are awarded resources, if any are left, in the order of their original bid values. By increasing bid values of only those last auction round losers in the Possible Winner class who bid higher in the current auction round than in the previous one, the method prevents bidders with habitual low bidding patterns from becoming winners.

2.2. Last Minute Allocation (LMA): In the recurring auction, each bidder may have a drop point, denoted as L, that is defined as the number of consecutive losses in the subsequent auction rounds that will motivate the bidder to leave the recurring auction altogether. In LMA method, the auctioneer predicts each bidder's drop point L and then all bidders in Possible Winner class whose consecutive loss is equal to L−1 and the bid is larger than the bid in the previous auction round have their bid value increased by B. There are various ways of predicting the bidder's drop point that could be used in implementing this method. One, for example could be to keep the average or minimum number of consecutive losses for the bidders who actually dropped out of the recurring auction to predict the drop point for the remaining bidders.

2.3. Random Allocation (RA): a bidder ranked k in Possible Winner class is selected as a winners randomly, with probability $p_k$, that, for example could be equal $(R-N_{DW})/N_{PW}$ regardless of the bidder rank. However, there is no restriction on probability $p_k$ except that all those probabilities add up to the number or resources available for Possible Winner class (that is to $R-N_{DW}$).

2.4. Loss Increment Allocation (LIA): This method assigns to each bidder with rank k in Possible Winner class, either multiplicative or additive bid increment $I_k$ and then the bid value is modified accordingly (for multiplicative bid increment the bid value v becomes $v*I_k$ and for the additive bid increment the new bid value is $v+I_k$). There are no limitations on how increment $I_k$ is determined. One embodiment of this method defines the multiplicative bid increment as $I_k=1+0.01*m$, where m denotes the number of consecutive losses that the bidder sustained in the previous auction rounds.

The preferred embodiment of the second approach of participant retention methodology is the following method and software program.

2.5 Participation Incentive (PI): Under this method, each bidder is rewarded for participation in the current and previous auction rounds with the score $WS_i$ defined for each bidder ranked i in Possible Winner class as the difference between the product of k-th power of bid value of bidder ranked i and the number of auction rounds that he participated in divided by coefficient a and the number of winning rounds, that can be expressed algebraically as follows:

$$WS_i = b_i^k NP_i/a - NW_i, \quad (1)$$

where $NP_i$ and $NW_i$ denote the cumulative number of times that bidder ranked i participated and won, respectively, up to and including the current auction round. Since the outcome of the current auction round is yet unknown, $NP_i > NW_i$. The term $b_i^k NP_i/a$ represents the expected number of wins until the current auction round; a is a coefficient that controls the expected number of wins and k is a coefficient that controls how the differences between bid values affects the probability of win. Thus, the winning score $WS_i$ of bidder ranked i in Possible Winner class represents the difference between the expected and experienced numbers of wins. The PI method assumes that higher the winning score of a bidder is, higher the probability of him dropping out of the future auction rounds is because more below his expectations the winnings are. For this reason, the PI method re-ranks the bidders in Possible Winner class in the decreasing order of their winning scores and up to $R-N_{DW}$ highest re-ranked bidders in this class are selected as winners of the current auction round.

As shown by equation (1), the participation of a loser of the last auction round is rewarded directly by increasing her winning score in the current and future auction rounds. Therefore, the PI participant retention method can control bidder drop problem by encouraging bidders' participation in future auction rounds.

If in equation (1), coefficient a is increased, the effect of the bid value in the winning score is diminished. Thus, the lower bidding bidders experience more wins and the range of winners over the original ranking is broadened over Possible Winner class. Reversely, if coefficient a is decreased, the win distribution narrows and concentrates on the higher bidding bidders in Possible Winner class. The optimal value of coefficient a dependents on the auctioneer's marketing strategy. In the preferred embodiment of this invention, coefficient a is set to the value that makes the average value of winning score of all bidders equal to zero. Since in each round, all bidders in Possible Winner class increase their winning scores cumulatively by $$\sum_{i=1}^{N_{PW}} \frac{b_i^k}{a}$$

(which is the sum of k-th powers of their bids divided by the coefficient a) and at the same time their winning scores decrease cumulatively by $R-N_{DW}$ wins (the number of resources allocated to Possible Winner class), the balancing value of coefficient a is equal to the sum of k-th powers of all bid values of bidders in Possible Winner class divided by the number of resources allocated to this class (that is $R-N_{DW}$).

Pricing Methods:

Once the winners are selected, the prices for the resources allocated to the winners are established. In this process, the prices are determined by the original bids of each winner, regardless of the changes made to the bids during winner selection. However, the bidders who are the winners thanks to increasing their bid values through participant retention method win the resources above their original rank, prices charged to them can be computed as the minimum of their bid and the price to be paid by the bidder with the original rank that the winner acquired through participant retention method. In case of the First Price Sealed Bid (FPSB) auction, this would not change the pricing, as the winners would simply pay according to their bids. However, in case of the Second Price Sealed Bid (SPSB) auction, the prices to be paid could change.

In general, the present invention is applicable to an auction system and design, regardless of pricing method employed. In one embodiment of the present invention, a uniform pricing method is used in which the bidders in Definite Winner class are charged their reservation price $P_{PW}$ and the winners in Possible Winner class are charged their reservation price $P_{PW}$. In another embodiment of the present invention, a discriminatory pricing method is employed in which each winner is charged the price that is either a fraction of his bid defined by a coefficient f (so the price for a bidder with bid b is f*b), or equal to the bid of the bidder with the rank next to the winner, or a combination of those two prices. The coefficient f could be any positive number less or equal to 1 and it could be the same or different for each bidder. Yet another embodiment of the present invention uses discriminatory pricing for one class and uniform pricing for another class. For example, uniform price $P_{DW}$ is charged to all bidders in Definite Winner class while each winner in Possible Winner class is charged the price that is a fraction of his bid.

The following references may be related to the present invention:

[1] R. McAfee and P. J. McMillan (1997), "Auction and Bidding", Journal of Economic Literature, 25:699-738.
[2] V. Krishna, Auction Theory (2002), Academic Press, San Diego.
[3] W. Vickrey (1961), "Counter speculation, Auction, and Competitive Sealed Tenders", Journal of Finance, 16(1).
[4] M. Bichler (2001), The Future of e-market: Multidimensional Market Mechanism, Cambridge University Press, Cambridge, UK.
[5] M. Bichler, M. Kaukal, and A. Segev (1999), "Multi-attribute auctions for electronic procurement", Proc. 1$^{st}$ IBM IAC Workshop on Internet based Negotiation Technologies, Yorktown Heights, N.Y.
[8] T. Sandholm (2000), "Approaches to winner determination in combinatorial auctions", Decision Support System, 28 (1):165-176.
[9] M. H. Rothkopf, and A. Pekec (1998), "Computationally Manageable Combinatorial Auction", Proc. Maryland Auction Conference, Maryland.
[10] T. Sandholm (1999), "Automated Negotiation", Communication of the ACM, 42(3): 84-85.
[11] H. Varian (1995), "Economic Mechanism Design for Computerized Agents", Proc. Usenix Workshop on Electronic Commerce, New York.
[12] N. Brooks (2004), "The Atlas Rank Report: How Search Engine Impacts Traffic", Atlas Institute, available at www.atlasdmt.com
[13] J. S. Lee and B. K. Szymanski (2004), "A Novel Auction Mechanism for Selling Time-Sensitive E-Service", Proc. 7th International IEEE Conference on E-Commerce Technology (CEC'05), Munich, Germany.

What is claimed is:

1. A method for an auctioneer to allocate perishable or time-specific resources to bids in a plurality of auction rounds, wherein allocating of resources to bids in each auction round is executed on at least one computer comprising computer-readable medium with computer executable instructions to perform computer-implemented operations necessary for timely execution of said allocation of resources, comprising:
 (a) said computer receiving in its storage and thus having available a list of perishable goods or time-specific resources traded in a given auction round, wherein said list of perishable goods or time-specific resources to be traded in said given round is ranked according to factors set by the auctioneer and each perishable goods or time-specific resource is traded only in said auction round because said perishable goods or time-specific resource loses value if not allocated because it is perishable or time-specific;
 (b) said computer receiving bids relevant to said auction round wherein each bid comprises a bid price for allocation of one of the perishable goods or time-specific resources listed in said list of perishable goods or time-specific resources received in step (a), and information identifying a participant bidder making said bid;
 (c) said computer establishing bid values for said bid prices received in step (b), comprising:
  (c1) in relation to said participant bidders, accessing records comprising bids received and resource allocation made for previous auction rounds,
  (c2) in at least some of said auction rounds, establishing said bid values by at least one bid modification action selected from the group consisting of: (i) establishing bid values higher than said bid prices received in step (b) for participant bidders with a low frequency of winning previous auction rounds or with a record of losing recent auction rounds; and (ii) establishing bid values lower than said bid prices received in step (b) for participant bidders with a high frequency of winning previous auction rounds or with a record of winning recent auction rounds,
  (c3) sorting said bid values in order of said bid values,
  (c4) not restricting participation in a future auction round based on a participant bidder winning or losing in said given round or in a previous round; and
 (d) said computer allocating each of said perishable goods or time-specific resources to said bids based on said bid values established in said step (c) in relation to said ranking by the auctioneer in said step (a), rather than based on said bid prices received in said step (b).

2. The method of claim 1 wherein an auctioneer sets a minimum bid price and step (c) is executed only for bids with bid prices not lower than said minimum bid price.

3. The method of claim 1 wherein an auctioneer sets a maximum number of bids for which said step (c2) is executed.

4. The method of claim 1 wherein resources traded in each auction round comprise spaces for paid advertisements on at least one Internet page.

* * * * *